(12) United States Patent
Rodriguez et al.

(10) Patent No.: US 11,342,819 B2
(45) Date of Patent: May 24, 2022

(54) ELECTRICAL MACHINE WITH AN ACTIVE GROUNDING

(71) Applicant: ABB Schweiz AG, Baden (CH)

(72) Inventors: Pedro Rodriguez, Västerås (SE); Subrat Sahoo, Västerås (SE); Cajetan Pinto, Mumbai (IN); Klaus Vänskä, Tolkkinen (FI)

(73) Assignee: ABB Schweiz AG, Baden (CH)

( * ) Notice: Subject to any disclaimer, the term of this patent is extended or adjusted under 35 U.S.C. 154(b) by 122 days.

(21) Appl. No.: 15/762,459

(22) PCT Filed: Oct. 4, 2016

(86) PCT No.: PCT/EP2016/073635
§ 371 (c)(1),
(2) Date: Mar. 22, 2018

(87) PCT Pub. No.: WO2017/060218
PCT Pub. Date: Apr. 13, 2017

(65) Prior Publication Data
US 2018/0269753 A1 Sep. 20, 2018

(30) Foreign Application Priority Data
Oct. 8, 2015 (EP) .................................... 15188912

(51) Int. Cl.
*H02P 27/08* (2006.01)
*H02P 6/18* (2016.01)
(Continued)

(52) U.S. Cl.
CPC ......... *H02K 11/40* (2016.01); *H02K 11/0094* (2013.01); *H02P 29/032* (2016.02); *H02P 29/50* (2016.02); *H02P 31/00* (2013.01)

(58) Field of Classification Search
CPC ............... H02J 4/00; H02P 7/20; H02K 21/16
(Continued)

(56) References Cited

U.S. PATENT DOCUMENTS 3,881,137 A * 4/1975 Thanawala .......... H03H 7/1791
361/113
4,267,461 A * 5/1981 Grassmann ............ H04B 15/02
307/105
(Continued)

FOREIGN PATENT DOCUMENTS

DE 3511755 A1 10/1985
EP 1537427 B1 8/2008
(Continued)

OTHER PUBLICATIONS

European Search Report Application No. 15188912.8 Completed: Mar. 10, 2016; dated Mar. 22, 2016 7 pages.
(Continued)

*Primary Examiner* — Muhammad S Islam
*Assistant Examiner* — Charles S Laughlin
(74) *Attorney, Agent, or Firm* — Whitmyer IP Group LLC

(57) ABSTRACT

A method for preventing a frequency component of a voltage from occurring in an electrical machine including the steps of: obtaining, either by measuring a voltage signal or a current signal from the electrical machine in time domain and transforming the measured signal into frequency domain, by simulating or deducing a first frequency component present in the electrical machine in absence of a grounding, the first frequency component representing a first undesired frequency higher than a limit frequency of 500 Hz; and providing the electrical machine with a first grounding at a grounding location, the first grounding including a resonant circuit resonating at the first undesired frequency. In order to get rid of harmful shaft voltages in the form of
(Continued)

sharp voltage peaks at high frequencies, it is first necessary to determine at which undesired frequency or frequencies these voltage peaks occur. Only thereafter can a low impedance grounding be provided that works satisfactorily at the undesired frequency or frequencies.

20 Claims, 3 Drawing Sheets

(51) Int. Cl.
*H02K 11/40* (2016.01)
*H02P 29/50* (2016.01)
*H02P 31/00* (2006.01)
*H02K 11/00* (2016.01)
*H02P 29/032* (2016.01)

(58) Field of Classification Search
USPC .. 318/400.22, 400.24, 400.25, 607, 78, 723, 318/128
See application file for complete search history.

(56) References Cited

U.S. PATENT DOCUMENTS

| | | | |
|---|---|---|---|
| 7,034,706 B1* | 4/2006 | Nippes | G01R 31/343 340/635 |
| 7,102,379 B2 | 9/2006 | Hobelsberger et al. | |
| 7,710,081 B2* | 5/2010 | Saban | H02K 3/28 290/4 R |
| 8,396,677 B2 | 3/2013 | Hobelsberger et al. | |
| 2002/0117913 A1* | 8/2002 | Raith | H02M 1/12 310/68 R |
| 2005/0184751 A1 | 8/2005 | Hobelsberger et al. | |
| 2005/0200378 A1 | 9/2005 | Hobelsberger et al. | |
| 2006/0125335 A1 | 6/2006 | Brauer | |
| 2008/0074309 A1* | 3/2008 | Nilsson | G01F 23/284 342/124 |
| 2008/0168409 A1* | 7/2008 | Chiu | G06F 17/5036 716/113 |
| 2009/0179663 A1* | 7/2009 | Hobelsberger | G01R 31/343 324/765.01 |
| 2012/0319723 A1 | 12/2012 | Hassel et al. | |
| 2013/0049772 A1 | 2/2013 | Hassel et al. | |
| 2013/0170077 A1* | 7/2013 | Dillig | H02H 3/347 361/18 |
| 2015/0249419 A1* | 9/2015 | Lee | H02M 1/32 318/503 |

FOREIGN PATENT DOCUMENTS

| | | |
|---|---|---|
| EP | 3154173 A1 | 4/2017 |
| FR | 824499 A | 2/1938 |
| WO | 9745926 A2 | 12/1997 |

OTHER PUBLICATIONS

International Search Report and Written Opinion of the International Searching Authority Application No. PCT/EP2016/073635 Completed: Dec. 6, 2016; dated Dec. 16, 2016 16 pages.

Kian Jin Ong, Raymond, "An investigation of shaft current in a large sleeve bearing induction machine", (1999). Open Access Dissertations and Theses. Paper 1814, McMaster University, 360 pages.

Technical Guide No. 5—"Bearing currents in modem AC drive systems", ABB Industry Oy, Copyright ABB Automation Croup Ltd, 1999, 24 pages.

* cited by examiner

ELECTRICAL MACHINE WITH AN ACTIVE GROUNDING

TECHNICAL FIELD

The present invention relates to an avoidance of undesired frequency components of voltages in electrical machines. It particularly relates to protection of electrical machines and load against harmful shaft voltages that can cause bearing currents and consequently damage bearings.

BACKGROUND

Shaft voltages are a well-known problem in electrical machines. Changing magnetic fields around the shaft induce to the shaft currents that may result into very high voltage differences between the opposite ends of the shaft and the ground. Currents and corresponding voltages may also occur in stator core laminations of electrical machines. According to the electric circuit theory the currents will indomitably try to find a path to ground. As illustrated in FIG. 1, there are many potential current paths via capacitive couplings from the shaft and from the stator core laminations to ground. Current flow through bearings may occur if the shaft happens to be shorted to a stator frame via the bearings (for example at a low rotational speed at startup) or if voltage across the bearing lubricant film exceeds the film breakdown voltage (discharge current).

Bearing currents are harmful for the bearings as they cause bearing erosion in the forms of pitting, fluting, frosting, etc. on the surfaces of the bearing balls and races. The most common cause of undesired bearing currents for direct on-line (DOL) motors is a lack of motor symmetry. On the other hand, there exist external sources of bearing currents, such as common mode voltages which are a result of a voltage wave shape applied to a motor by an inverter. Since in an inverter fed motor the motor line to line terminal voltage must be either +Vdc or −Vdc, it is not possible, in contrast to DOL motors, to have the three terminal voltages to add to zero at any instant of time. An average voltage applied to the motor (over a cycle) is kept (close) to zero, but an instantaneous sum of the voltages at motor terminals is non-zero. This instantaneous voltage sum is called a common mode voltage. The common mode voltages generate currents that find different paths through capacitive couplings from within the motor to ground, and if no action is taken, high frequency current pulses may flow through the bearings.

It is conventionally known to mitigate the problem described above by grounding the shaft by means of a brush in galvanic contact with the shaft at one end of the same, the outer race of the bearing(s) at the opposite end of the shaft being electrically isolated from the ground. Such solution is known e.g. from DE3511755A1, which discloses a turbine installation with a generator, the references herein referring to FIGS. 3 and 6 of DE3511755A1. In order to prevent shaft voltages from occurring in a low frequency area (rotational frequency and related overtones), an ohmic grounding 7 is arranged on the shaft 11 at the drive end AS of the generator G. Furthermore, in order to prevent shaft voltages from occurring in a high frequency area, a capacitive grounding 8, 9, 27 is arranged on the shaft 11 at the non-drive end NS of the generator G. The bearing 4 at the non-drive NS end is electrically isolated from the ground 5 by means of a bearing isolation 6. Furthermore, according to FIG. 6 of DE3511755A1, the capacitive grounding 8, 9, 27 may additionally comprise an inductance 32 in series with a capacitance 9.

According to DE3511755A1 the shaft voltages in the high frequency area are caused by a rectifier 16 configured to excite rotor windings 14 of the generator G. While DE3511755A1 does not explicitly disclose what is to be understood with "high frequency area" in the context of the document, it implicitly discloses that the term refers to frequencies at 300 Hz or at 360 Hz. Namely, DE3511755A1 discloses that the high frequency components of the voltage are a result of a static excitation with corresponding commutation taking place in the rectifier 16. As FIG. 3 of DE3511755A1 shows, the rectifier 16 is a three-phase rectifier in which a three-phase alternating current (AC) is fed into. It is well known to a person skilled in the art that in a generator G according to DE3511755A1 a common practice is to provide the rectifier 16 with a six-pulse bridge resulting in a voltage fluctuation at 300 Hz at 50 Hz supply frequency, and in a voltage fluctuation at 360 Hz at 60 Hz supply frequency.

Because in the case of DE3511755A1 the voltage fluctuation frequency results directly from the supply frequency and the rectifier configuration, it can easily be calculated what value the voltage fluctuation frequency has, see DE3511755A1, page 15, lines 32-33. That is, in the case of DE3511755A1 there is no need to measure the voltage to find out the undesired frequency (voltage fluctuation frequency). Instead, the capacitor 9 and the inductance 32 can be dimensioned to exhibit a low impedance at the voltage fluctuation frequency without carrying out any voltage measurement. Probably there also exist harmonics of the voltage fluctuation frequency in the shaft 11 of DE3511755A1, but a person skilled in the art desiring to get rid of peak voltages both at the voltage fluctuation frequency and at harmonic frequencies of the same using a single low impedance grounding (according to the teaching of DE3511755A1) would dimension the capacitor 9 and the inductance 32 to exhibit low impedance at the voltage fluctuation frequency.

US20050200378A1 discloses a method for monitoring and/or analysis of electrical machines during operation by means of a shaft voltage measurement and analysis. US20050200378A1 is concerned with identifying shaft voltage frequency components for diagnostic purposes, and it does not suggest measures for preventing any such frequency components from occurring or disclose a grounding that is suitable for such purpose.

US20120319723A1 discloses a method for monitoring grounding quality in electrical machines by measuring a ground current of a grounding device. The grounding device provides an ohmic grounding, and a monitoring device identifies defects in the grounding device on the basis of measured ground current values.

U.S. Pat. No. 4,267,461A discloses a method for suppressing high frequency currents in an electrical machine. U.S. Pat. No. 4,267,461A assumes that there is a certain high frequency present in the electrical machine but apparently emerging from a source outside of the electrical machine, and provides means for suppressing the corresponding high frequency currents. However, the arrangement according to U.S. Pat. No. 4,267,461A is unable to detect or suppress any remaining high frequency currents that eventually are present in the electrical machine.

Despite of the existing solutions for mitigating problems related to shaft voltages, shaft voltages keep causing problems in many electrical machines. There therefore remains a desire to improve the existing solutions to prevent shaft voltages from occurring in a wider variety of electrical machines.

SUMMARY

One object of the invention is to provide an improved method for preventing a frequency component of a voltage from occurring in an electrical machine.

A further object of the invention is to provide an electrical machine with an improved grounding.

These objects are achieved by the method and device according to the different aspects of the invention.

The invention is based on the realization that in order to get rid of harmful shaft voltages in the form of sharp voltage peaks at high frequencies, it is first necessary to determine at which undesired frequency or frequencies these voltage peaks occur. Only thereafter can a low impedance grounding be provided that works satisfactorily at the undesired frequency or frequencies.

According to a first aspect of the invention, there is provided a method for preventing at least one frequency component of a voltage from occurring in an electrical machine. The method comprises the steps of: obtaining, either by measuring a voltage signal or a current signal from the electrical machine in time domain and transforming the measured signal into frequency domain, by simulating the electrical machine, or by deducing from operation settings of an inverter, a first frequency component present in the electrical machine in absence of a grounding, the first frequency component representing a first undesired frequency higher than a limit frequency of 500 Hz; and providing the electrical machine with a first grounding at a grounding location, the first grounding comprising a resonant circuit resonating at the first undesired frequency. By these measures a potentially harmful effect of the at least one frequency component in the electrical machine can be avoided.

According to one embodiment of the invention, the limit frequency is 1 kHz, 2 kHz, 4 kHz or 8 kHz.

According to one embodiment of the invention, the grounding location is at a stator core lamination or at a shaft of the electrical machine.

According to one embodiment of the invention, the first undesired frequency emerges from a common mode voltage.

According to one embodiment of the invention, the first frequency component is that with the highest voltage amplitude at frequencies above the limit frequency.

According to one embodiment of the invention, grounding impedance at the first undesired frequency is essentially zero.

According to one embodiment of the invention, resonant frequency of the resonant circuit is configured to be adjustable.

According to one embodiment of the invention, the resonant circuit comprises a capacitor and an inductor.

According to one embodiment of the invention, the method further comprises the steps of: obtaining a second frequency component present in the electrical machine in absence of a grounding, the second frequency component representing a second undesired frequency higher than the limit frequency and different from the first undesired frequency; and providing the electrical machine with a second grounding, the second grounding comprising a resonant circuit resonating at the second undesired frequency.

According to one embodiment of the invention, the obtaining of the first frequency component occurs during operation of the electrical machine.

According to one embodiment of the invention, the electrical machine comprises an inverter.

According to one embodiment of the invention, a switching frequency of the inverter is configured to change during operation of the electrical machine.

According to a second aspect of the invention, there is provided an electrical machine comprising: a frequency component identifier configured to obtain, either by measuring a voltage signal or a current signal from the electrical machine in time domain and transforming the measured signal into frequency domain, by simulating the electrical machine, or by deducing from operation settings of an inverter, a first frequency component of a voltage present in the electrical machine in absence of a grounding, the first frequency component representing a first undesired frequency higher than a limit frequency of 500 Hz, a first grounding at a grounding location, the first grounding preventing the first undesired frequency from occurring in the electrical machine, and the first grounding comprising a resonant circuit resonating at the first undesired frequency.

BRIEF DESCRIPTION OF THE DRAWINGS

The invention will be explained in greater detail with reference to the accompanying drawings, wherein.

DETAILED DESCRIPTION

Figure 1:
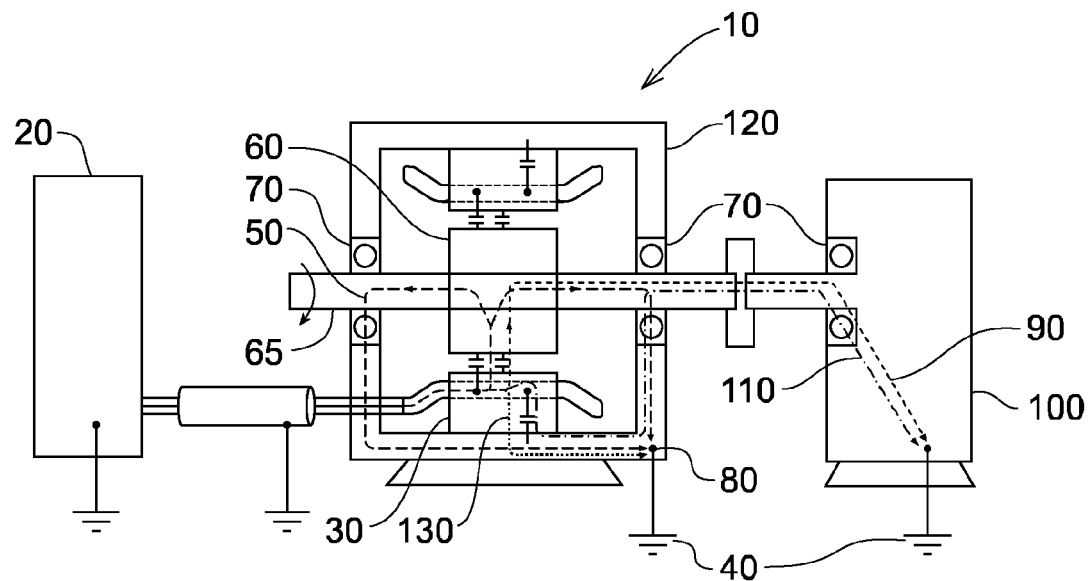
FIG. 1 shows potential current paths from stator core lamination of an electrical motor to ground.

Referring to FIG. 1, in an electrical motor 10 driven by an inverter 20 common mode voltages generate currents with several potential current paths from stator core lamination 30 through different capacitive couplings to ground 40. A first current path 50 represents a capacitive current coupled to a rotor 60, with a return path via a shaft 65, bearings 70 and a stator frame ground connection 80 to the ground 40. Also a second current path 90 represents a capacitive current coupled to the rotor 60. The coupling could be through the same mechanism as the first current path 50, but the current according to the second current path 90 finds a preferred route that passes through a load 100. A third current path 110 represents a capacitive current coupled to a stator frame 120, with a return path via the bearings 70, shaft 65 and the load 100 to the ground 40 in absence of the stator frame ground connection 80. A preferred current path is a fourth current path 130 representing a capacitive current coupled to the stator frame 120, and further directly to the ground 40 via the stator frame ground connection 80.

Figure 2:
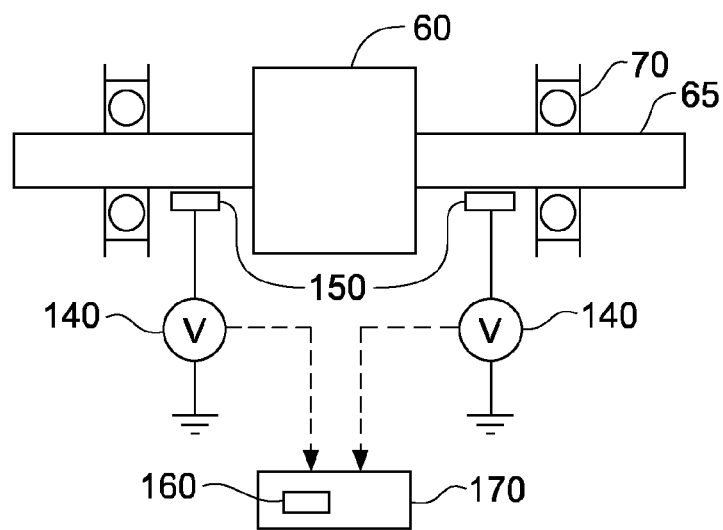
FIG. 2 shows a measurement arrangement for measuring a voltage at a shaft of an electrical motor

Referring to FIG. 2, voltage is measured at two locations of the shaft 65 with voltage meters 140. The voltage meters 140 are connected to the shaft 65 via brushes 150. As the voltage meters 140 have infinite impedances, the measurements cover all frequencies up to a limitation defined by a clock rate of a measurement processor 160. In practice the measurements may cover frequencies up to e.g. 100 kHz, or even up to 10 MHz. The voltage measurements give two measuring results, each containing voltage values in time domain. The measuring results are transformed into frequency domain by applying a fast Fourier transform (FFT) on them with the help of a computer 170.

After transforming the measuring results into frequency domain a frequency analysis can be made. In frequency domain the voltage will typically show amplitude peaks at rotation frequency, at supply frequency, and at other frequencies inherently present in the motor 10. For example, if the rotor 60 is excited be means of a rectifier, a six-pulse frequency emerging from the rectifier may be present. However, the rotation frequency as well as the supply frequency and the six-pulse frequency are all relatively low frequencies that do not create big problems as they can easily be grounded by means of conventional brushes 150. Typical brushes 150 manage the grounding task satisfactorily for frequencies up to at least 500 Hz even when they are of relatively low quality and/or worn out.

In an electrical motor 10 driven by an inverter 20 the voltage will furthermore typically show amplitude peaks in frequency domain at relatively high frequencies such as frequencies emerging from common mode voltages. These relatively high frequencies are more problematic with regard to eventual bearing currents as they cannot be easily grounded by means of conventional brushes 150. Even if some brushes 150 may manage to ground the high frequency components of the voltage when new, with time a brush's 150 performance rapidly decreases resulting in an increased impedance over a brush interface, and an increasingly large part of the voltages are discharged through alternative current paths traversing bearings 70.

Figure 3:
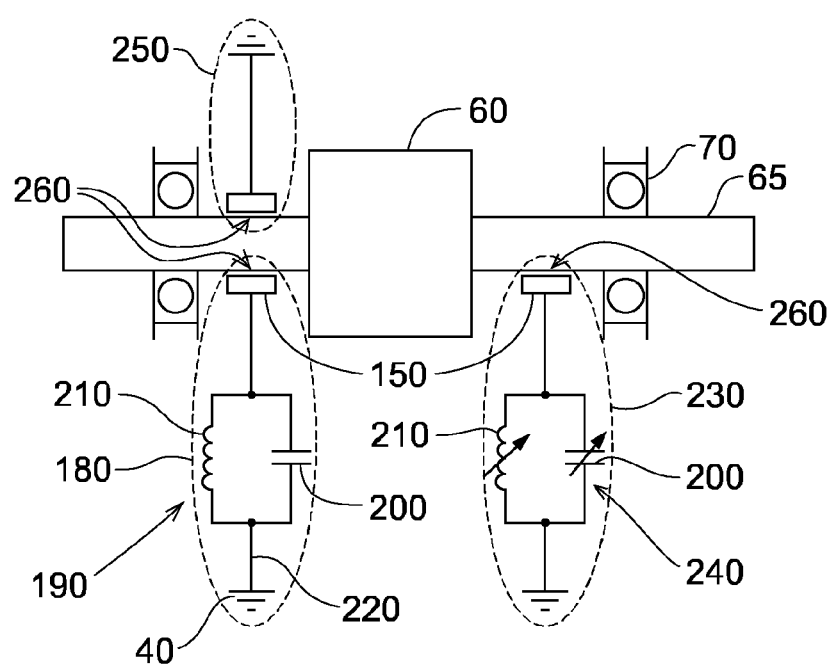
FIG. 3 shows one embodiment of the invention.
Figure 3A:
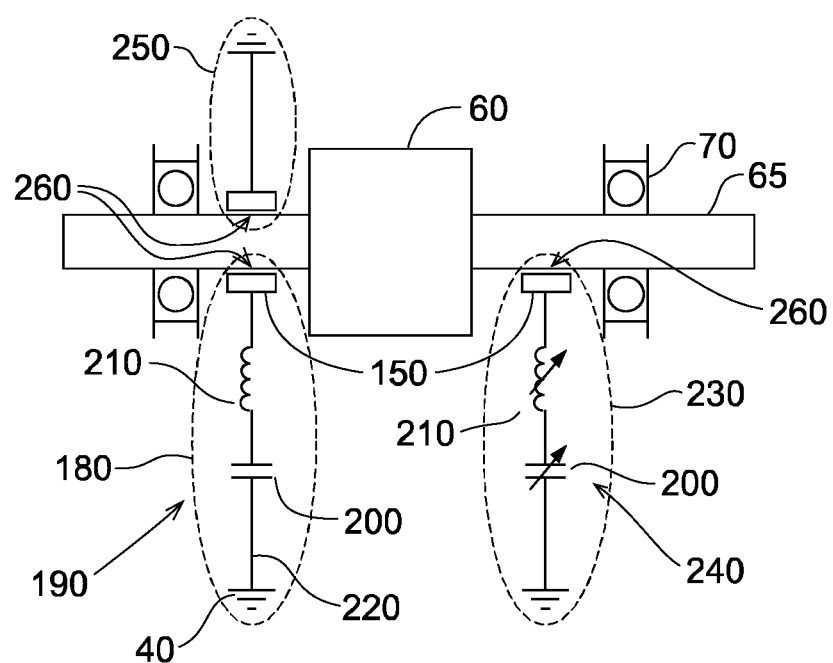
FIG. 3A shows one embodiment of the invention.

In order to provide a grounding path with low impedance (preferably zero impedance) for a high frequency component of the voltage, one such frequency component with a high amplitude is obtained from the frequency analysis. The computer 170 may act as a frequency component identifier configured to execute the task of obtaining the frequency component with the high amplitude. The choice of a frequency component to be obtained may e.g. be based on the amplitude of the same. For example, a frequency component with the highest amplitude at frequencies over 500 Hz may be obtained. The obtained frequency component now represents a first undesired frequency that one wants to get rid of. Referring to FIG. 3, when the first undesired frequency is known, a first grounding 180 comprising a first resonant circuit 190 resonating at the first undesired frequency is provided in order to reach low impedance at the first undesired frequency. The first resonant circuit 190 comprises a capacitor 200 and an inductor 210 arranged in parallel, and the first grounding 180 further comprises a brush 150 in contact with the shaft 65 at a grounding location 260, and cables 220 connecting the brush 150 via the first resonant circuit 190 to the ground 40.

According to the present invention it is crucial that the obtained frequency component reflects a frequency component present in the electrical machine during operation of the same. Instead of measuring a voltage signal and performing a frequency analysis on it, the frequency component can also be obtained by a corresponding frequency analysis on a current signal from the electrical machine, by simulating the electrical machine (10), or by deducing the frequency component from operation settings of an inverter (20). It is assumed that a person skilled in the art is capable of simulating an electrical machine such as to obtain potential frequency components reflecting frequency components present in the electrical machine during operation of the same. Since an inverter (20) is a probable source for an undesired frequency, a switching frequency of an inverter (20) can be considered as a frequency component representing an undesired frequency. This frequency component can be deduced from an inverter (20) simply by reading the switching frequency value from operation settings of the inverter (20). Some inverters (20) have a switching frequency that is configured to change during operation of the electrical machine (10), and therefore it may be necessary to read the inverter's (20) switching frequency value during operation of the electrical machine (10).

FIG. 3 furthermore shows a second grounding 230 at another grounding location 260 comprising a second resonant circuit 240. The second resonant circuit 240 may be identical with the first resonant circuit 190 in order to further improve the grounding at the first undesired frequency, or it may be dimensioned to resonate at a second undesired frequency different from the first undesired frequency in order to improve a grounding at the second undesired frequency. The capacitances of the capacitors 200 and the inductances of the inductors 210 may be adjustable as illustrated for the second resonant circuit 240 in FIG. 3 in order to render the resonant frequencies of the respective resonant circuits 190, 240 adjustable. The obtaining of the first and second undesired frequencies as well as the adjustment of the resonant circuits 190, 240 can be made automatic, and a same resonant circuit 190, 240 can be adjusted to resonate at different frequencies at different times. Any suitable number of groundings 180, 230 comprising resonant circuits 190, 240 can be provided to ground a corresponding number of undesired frequencies at a time. The number of groundings 180, 230 comprising resonant circuits 190, 240 may e.g. be one, two or three. A plurality of resonant circuits 190, 240 may be connected between a single brush 150 and the ground 40 to form a corresponding plurality of groundings 180, 230 comprising resonant circuits 190, 240.

FIG. 3 furthermore shows a third grounding 250 which is a conventional grounding with no resonant circuit 190, 240. While the third grounding 250 may work well for frequency components of the voltage at frequencies let's say up to 500 Hz, at higher frequencies it may happen that an alternative current path through the bearings 70 offers a lower impedance from the grounding location 260 of the third grounding 250 to the ground 40. The first and second groundings 180, 230 are preventing this from happening at least at the first undesired frequency by exhibiting a grounding impedance that is smaller than an impedance of any alternative current path from a respective grounding location 260 to the ground 40. The arrangement according to FIG. 3 therefore prevents a frequency component of a voltage from occurring at least at the first undesired frequency in the respective electrical motor 10. In the context of the present disclosure the action "preventing a frequency component of a voltage from occurring" shall be considered to be taken place when the amplitude of the respective frequency component at least halves in comparison with a situation without grounding 180, 230, 250.

The invention is not limited to the embodiments shown above, but a person skilled in the art may modify them in a plurality of ways within the scope of the invention as defined by the claims. Thus, the invention is not limited to electrical motors 10 but may also be applied to other electrical machines such as generators. Furthermore, the grounding locations 260 do not need to be at the shaft 65 but may also be at other machine elements such as at the stator core lamination 30. Yet furthermore, a resonant circuit 190, 240 does not necessarily need to comprise a capacitor 200 and an inductor 210 arranged in parallel, but it may also comprise a capacitor 200 and an inductor 210 arranged in series (FIG.

3A), or a combination of capacitors 200 and inductors 210 arranged in parallel and in series. A resonant circuit 190, 240 may be in the form of any suitable electrical circuit functioning as a band pass filter.

The invention claimed is:

1. A method for preventing at least one frequency component of a voltage from occurring in an electrical machine, the method comprising the steps of:
   obtaining, either by measuring a voltage signal or a current signal from the electrical machine in time domain and transforming the measured signal into frequency domain, by simulating the electrical machine, or by deducing from operation settings of an inverter, a first frequency component present in the electrical machine in absence of a grounding, the first frequency component representing a first undesired frequency higher than a limit frequency of 500 Hz; and
   providing the electrical machine with a first grounding at a grounding location, the first grounding comprising a resonant circuit resonating at the first undesired frequency, wherein the resonant circuit provides a low grounding impedance at the first undesired frequency.

2. The method according to claim 1, wherein the limit frequency is 1 kHz, 2 kHz, 4 kHz or 8 kHz.

3. The method according to claim 1, wherein the grounding location is at a stator core lamination.

4. The method according to claim 1, wherein the first undesired frequency emerges from a common mode voltage.

5. The method according to claim 1, wherein the first frequency component is that with the highest voltage amplitude at frequencies above the limit frequency.

6. The method according to claim 1, wherein the low grounding impedance at the first undesired frequency is essentially zero.

7. The method according to claim 1, wherein resonant frequency of the resonant circuit is configured to be adjustable.

8. The method according to claim 1, wherein the resonant circuit comprises a capacitor and an inductor.

9. The method according to claim 1, wherein the method further comprises the steps of:
   obtaining a second frequency component present in the electrical machine in absence of a grounding, the second frequency component representing a second undesired frequency higher than the limit frequency and different from the first undesired frequency; and
   providing the electrical machine with a second grounding, the second grounding comprising a resonant circuit resonating at the second undesired frequency.

10. The method according to claim 1, wherein the obtaining of the first frequency component occurs during operation of the electrical machine.

11. The method according to claim 1, wherein the electrical machine comprises an inverter.

12. The method according to claim 11, wherein a switching frequency of the inverter is configured to change during operation of the electrical machine.

13. An electrical machine comprising:
   a frequency component identifier configured to obtain, either by measuring a voltage signal or a current signal from the electrical machine in time domain and transforming the measured signal into frequency domain, by simulating the electrical machine, or by deducing from operation settings of an inverter, a first frequency component of a voltage present in the electrical machine in absence of a grounding, the first frequency component representing a first undesired frequency higher than a limit frequency of 500 Hz,
   a first grounding at a grounding location, the first grounding preventing the first undesired frequency from occurring in the electrical machine, and the first grounding comprising a resonant circuit resonating at the first undesired frequency, wherein the resonant circuit provides a low grounding impedance at the first undesired frequency.

14. The electrical machine according to claim 13, wherein the limit frequency is 1 kHz, 2 kHz, 4 kHz or 8 kHz.

15. The electrical machine according to claim 13, wherein the frequency component identifier is configured to obtain the first frequency component during operation of the electrical machine.

16. The electrical machine according to claim 14, wherein the frequency component identifier is configured to obtain the first frequency component during operation of the electrical machine.

17. The method according to claim 2, wherein the grounding location is at a stator core lamination or at a shaft of the electrical machine.

18. The method according to claim 2, wherein the first undesired frequency emerges from a common mode voltage.

19. The method according to claim 2, wherein the first frequency component is that with the highest voltage amplitude at frequencies above the limit frequency.

20. The method according to claim 1, wherein the grounding location is at a shaft of the electrical machine.

* * * * *